March 31, 1959  F. W. TORRANCE  2,879,552
DEMOUNTABLE SUPPORTING STRUCTURE
Filed July 26, 1954  3 Sheets-Sheet 1
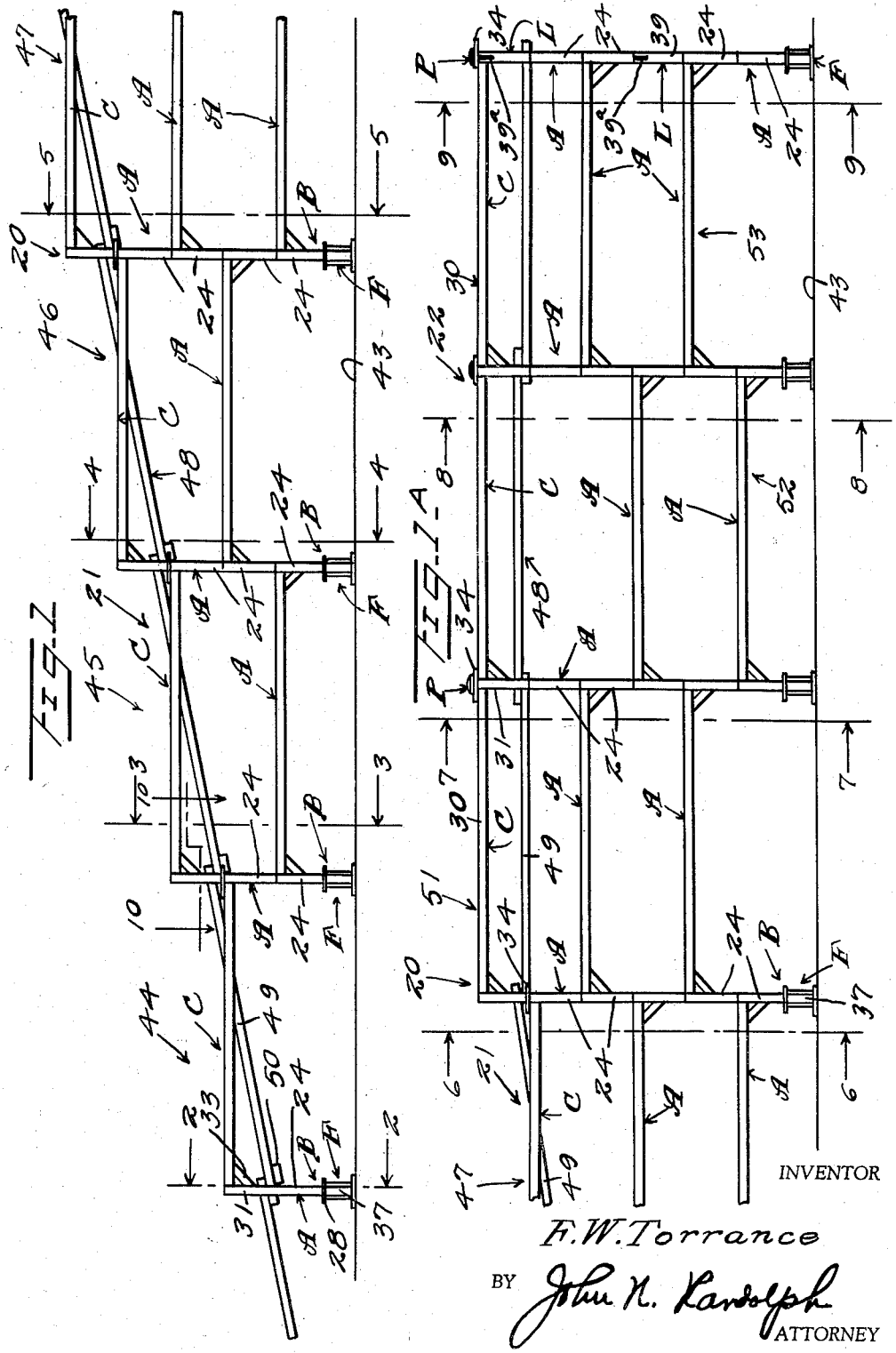
INVENTOR
F. W. Torrance
BY John N. Randolph
ATTORNEY

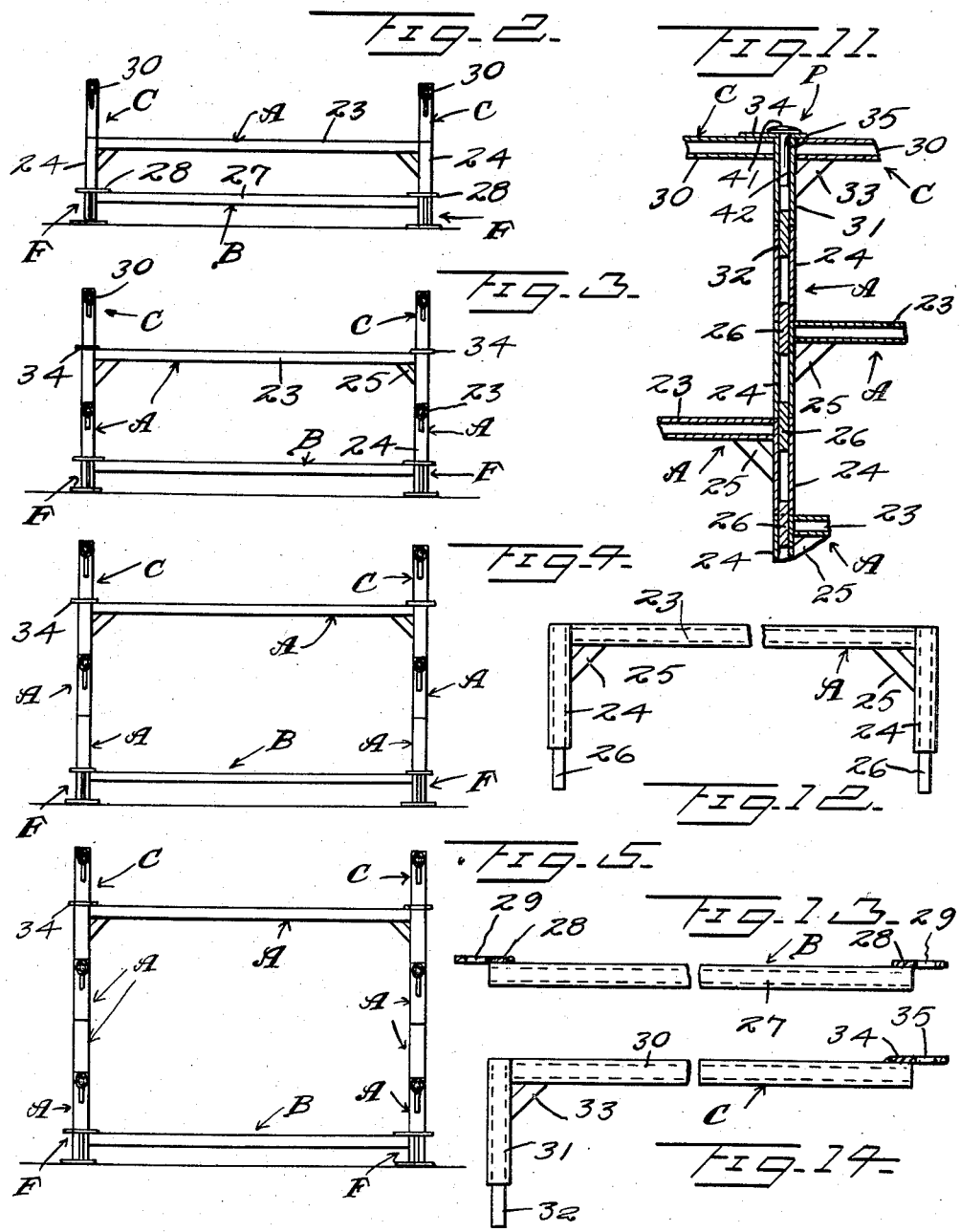

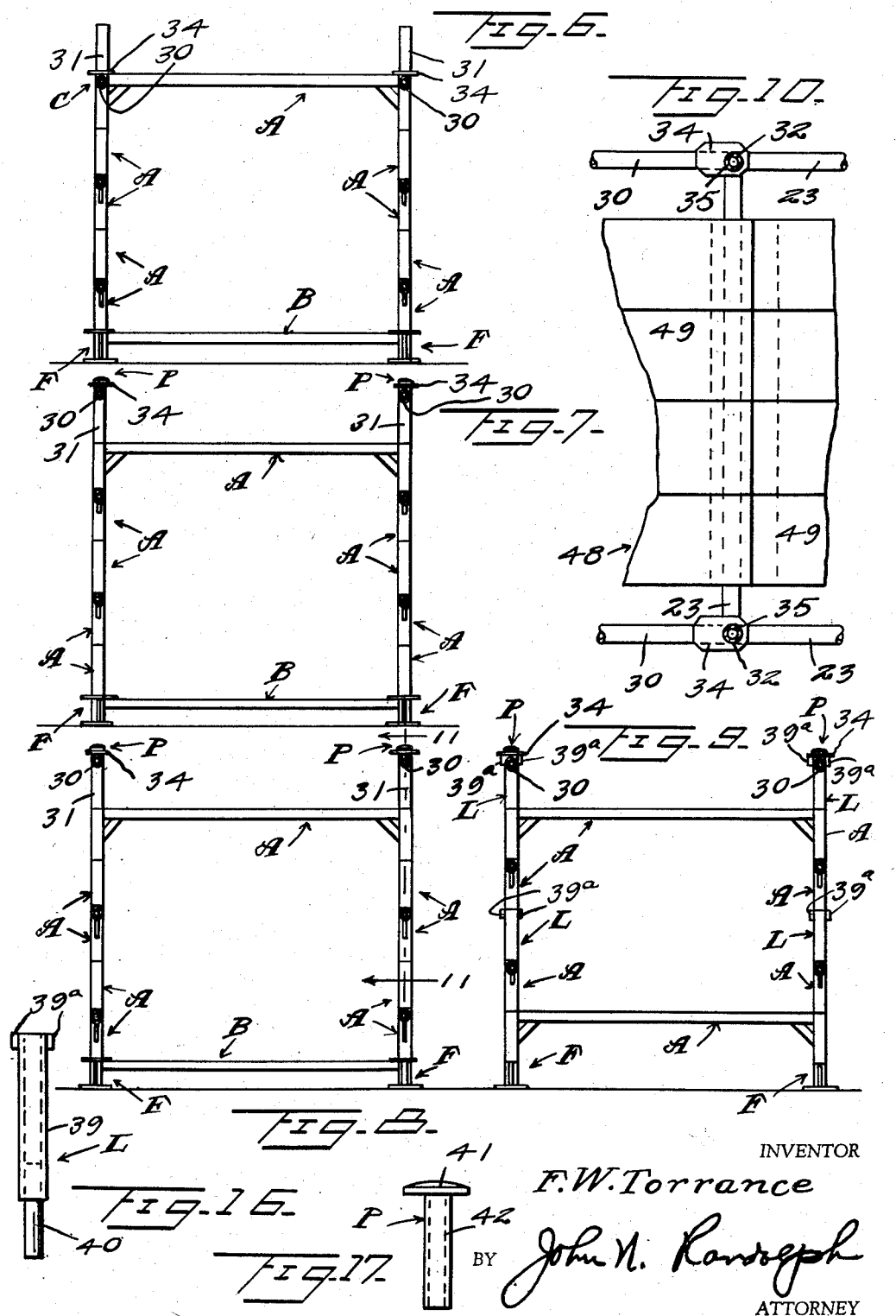

United States Patent Office 2,879,552
Patented Mar. 31, 1959

2,879,552

DEMOUNTABLE SUPPORTING STRUCTURE

Frank W. Torrance, Hamilton, Ontario, Canada

Application July 26, 1954, Serial No. 445,564

6 Claims. (Cl. 20—1.126)

This invention relates to a novel demountable supporting structure composed of a plurality of individual structural units which, due to their unique construction, are capable of being readily assembled in various relationships to form various structures such as the frame of a runway, ramp, scaffold, grandstand et cetera.

Another object of the invention is to provide readily assembled structural units which are readily adapted for supporting planking or the like to provide seats, platforms, or horizontal or inclined runways or ramps, respectively.

A further object of the invention is to provide a unique demountable supporting structure which due to the novel relationship of the structural units of which it is composed may be constructed to any desired height, width or length and with sections thereof of increasing or diminishing elevation.

Still a further object of the invention is to provide a demountable supporting structure requiring no separate fastenings other than the structural units thereof for assembling the structural units to form any desired supporting structure and which supporting structures may be completely assembled or dismantled without the use of any tool and in a minimum of time.

Various other objects and advantages of the invention will hereinafter become more fully apparent from the following description of the drawings, illustrating a presently preferred embodiment thereof, and wherein:

Figure 1 is a side elevational view of one end of a supporting structure assembled from a combination of the individual structural units;

Figure 1A is a similar view of the other end of said supporting structure;

Figures 2, 3, 4, 5, 6, 7, 8 and 9 are cross sectional views of the supporting structure taken substantially along planes as indicated by the lines 2—2, 3—3, 4—4 and 5—5 of Figure 1 and 6—6, 7—7, 8—8 and 9—9 of Figure 1A, respectively.

Figure 10 is a fragmentary horizontal sectional view taken substantially along a plane as indicated by the line 10—10 of Figure 1;

Figure 11 is an enlarged fragmentary detail longitudinal sectional view taken substantially along a plane as indicated by the line 11—11 of Figure 8;

Figure 12 is a fragmentary side elevational view of one of the basic structural units;

Figure 13 is a similar view of another of the basic structural units;

Figure 14 is a similar view of a third type of basic structural unit;

Figure 15 is a side elevational view of a fourth type of basic structural unit;

Figure 16 is a side elevational view of a fifth type of basic structural unit;

Figure 17 is a side elevational view of a sixth type of basic structural unit, and Figure 18 is an enlarged cross sectional view of the spanner element of any one of the structural units as illustrated in Figures 12, 13 and 14.

For the purpose of illustrating one of a multiplicity of demountable supporting structures capable of being assembled by the use of basic structural units as illustrated in Figures 12 to 17, one form of such a demountable supporting structure has been illustrated in Figures 1 to 11 and particularly in Figures 1 and 1A and is designated generally 20. The supporting structure 20 has one end portion, designated generally 21, constituting an inclined runway or ramp and an opposite end portion, designated generally 22, constituting the frame of a horizontal runway or scaffold, for example. The supporting structure 20 has been illustrated because it affords a good example of the use of the six types of basic structural units in combination. As the description proceeds, it will become readily apparent that numerous other supporting structures are capable of being erected by use of the novel basic structural units, for the erection of many of which all types of the basic structural units need not be utilized.

Figure 12 illustrates a basic structural unit designated generally A which includes a spanner element 23 in the form of an elongated tube which is rigid and preferably of oval shape cross section, as best illustrated in Figure 18. A depending leg element or riser 24, is secured to each end of the spanner element 23. The leg elements 24 have their upper ends disposed flush with the upper surface of the spanner 23 and are disposed parallel to one another and in the same plane. The widest cross sectional part of the spanner 23 is disposed parallel to the risers 24, so that the spanner will possess the maximum supporting strength. The spanner 24 is also braced adjacent its ends to the leg elements or risers 24 by rigid diagonal braces 25. The risers 24 are of the same length and each has a connector stem or pin 26 fixed in and depending from the lower end thereof. The pin 26 may be of solid or tubular construction depending upon the size of the structural unit A and consistent with the pins or stems 26 being of sufficient strength and rigidity.

The structural unit illustrated in Figure 13 is designated generally B and comprises a spanner element 27, corresponding to the spanner element 23 and which is of the same length as said element 23. Unit B includes a pair of connector plates 28, each formed of a flat piece of relatively thin but rigid metal. The connector plates 28 have inner ends disposed on the upper narrow portion of the ends of the spanner 27 and suitably secured rigidly thereto. The other ends of the plates 28 which protrude beyond the ends of the spanner 27 are each provided with an opening 29 sized to receive a riser 24.

The basic structural unit C, illustrated in Figure 14, constitutes a combination of the structural units A and B and includes a spanner 30, corresponding to the spanners 23 and 27 and which is of the same length. One end of the structural unit C is provided with a leg or riser 31 having a pin or stem 32 and braced relatively to the spanner by a diagonal brace 33. The leg or riser 31 is secured to and end of the spanner 30 in the same manner that the legs or risers 24 are secured to the ends of the spanner 23. Further, the riser 31 corresponds to the risers 24 and the stem 32 corresponds to the stems 26. The spanner 30 at its opposite end is provided with a plate 34 corresponding to the plate 28 on either end of the spanner 27 and having an opening 35 corresponding to the opening 29 of either plate 28. The basic structural units A, B and C constitute the three primary structural units. The structural units as illustrated in Figures 15, 16 and 17 constitute secondary units which are less essential and/or less frequently required. The structural unit F as illustrated in Figure 15 constitutes a foot member and includes a bottom plate 36 the upper side of which is secured to a lower end of a tube or socket 37 which extends upwardly from and is disposed perpendicular to the plate 36. The tube 37 is preferably of substantially the same external diameter as the risers 24 and 31 and has an internal diameter sized to slidably but relatively snugly receive the connector stems 26 or 32. The unit F also includes a pair of oppositely disposed ribs or webs 38 which are secured at inner edges thereof to opposite sides of the tube 37 and which extend from end-to-end of said tube. The ribs 38 function as additional supporting means for the outer ends of the plates 28 or 34.

The structural unit L as illustrated in Figure 16 comprises a tubular leg element or riser 39, corresponding in size to the risers 24 and 31 and a connecting pin or stem 40, which is secured to the lower end of the riser 39, which corresponds to the stems 26 and 32. The riser 39 is provided at its upper end with a pair of oppositely disposed lugs 39a mounted on the outer side of the riser. The individual leg element L is illustrated in Figure 16 on an enlarged scale relatively to the scale of Figures 12 and 14. Figure 17, which is also on an enlarged scale relatively to Figures 12, 13 and 14, illustrates the sixth structural unit comprising a pin P including a head 41 and a depending straight stem 42. The stem 42 is of the same outer diameter as the stems 26, 32 and 40.

Referring now to the demountable supporting structure 20 as illustrated in Figures 1 to 11, the lower end of the inclined end portion 21 thereof, as illustrated at the left-hand end of Figure 1 and in Figure 2, includes a pair of laterally spaced foot members F which rest on any suitable substantially horizontal supporting surface 43 and on the upper ends of the ribs 38 of which rest the connector plates 28 of a unit B which extends between said foot members. A unit A is disposed above said unit B, as best seen in Figure 2, and the risers 24 thereof extend downwardly through the plate openings 29 and their stems engage in the tubes 37 for connecting the units A and B and the units A and F. The units A and B are disposed transversely of the supporting structure 20. The stems 32 of a pair of units C extend downwardly into the upper ends of the risers 24 of the unit A and the risers 31 of the units C extend upwardly from said risers 24. The spanners 30 of said units C extend longitudinally of the structure 20 so that the units C are disposed at right angles to the units A and B, disposed therebeneath.

As seen in Figures 1 and 3, the next transverse portion of the supporting structure end 21 likewise includes a pair of foot members F supporting thereon a transversely disposed unit B forming a cross brace. A pair of longitudinally extending units A have corresponding ends disposed above the ends of said cross unit B and the foot members F and connected to members F by the risers 24 thereof extending into the tubes 37, and to the unit B by the risers 24 extending through the openings 29. The other ends of said longitudinal units A are similarly connected to another pair of foot members F and a transverse unit B, as illustrated in Figure 4. As seen in Figure 3, a unit A is disposed transversely above the left-hand ends of said aforementioned longitudinal units A and is of course connected thereto by the stems 26 extending into the upper ends of the risers 24 of the longitudinal units A. The spanner 23 of the last mentioned unit A supports the plates 34 of the aforementioned longitudinally disposed units C of the first left-hand section 44 of the structure part 21 and said plates 34 are connected to said unit A by the risers 31 of two longitudinally disposed units C which form upper parts of the next or second section 45. Said risers 31 extend upwardly from said last mentioned plates 34, so that the uppermost units C of the section 45 are disposed above the level of the units C of the section 44. The next section 46, the left-hand end of which is shown in Figure 4, includes in addition to the foot member F and the bottom transversely disposed unit B, the risers 24 of the two longitudinally disposed units A of the section 45. The section 46 includes a pair of longitudinally disposed units A, the risers 24, forming corresponding ends of which, are connected to and rise from the risers 24 of the longitudinal units A of the section 45. A transversely disposed unit A has its risers connected to and disposed above the left-hand end risers 24 of said longitudinal units A of the section 46, and said last mentioned risers 24 support the plates 34 of the longitudinal units C of the section 45. The top of the section 46 corresponds to the top of the section 45, being formed of two longitudinally disposed units C which are disposed above the level of the units C of said section 45 a distance corresponding to the length of a riser.

The next section 47 at its left-hand end, as illustrated in Figures 1 and 5, includes a pair of foot members F to support the end plates 28 of a transversely disposed unit B. Risers of a pair of bottom longitudinal units A are connected to and extend upwardly from said last mentioned plates 28 and in turn support the risers 24 of the two longitudinal units A of the section 46 on which in turn are supported risers 24 of an upper pair of longitudinal units A of said section 47. A transversely disposed unit A, forming a cross brace, has its risers 24 disposed on and connected to the left-hand end risers 24 of said upper longitudinal units A of the section 47. The spanner 23 of the last mentioned transverse unit A supports the plates 34 of the longitudinal units C of the section 46. The upper part of the section 47 is formed by two longitudinally disposed units C, corresponding to the top portion of each of the aforementioned sections. It will also be noted that the left-hand end of each section includes a transverse unit A disposed directly beneath the risers 31 of the top units C of said section, so that said transverse units A are likewise disposed progressively in stepped relationship one above the other from left to right of the structure part or end 21. The spanners 23 of these transversely disposed units A provide supporting braces for planking constituting an inclined runway or ramp, as illustrated in Figure 1 and designated 48. The ramp may be composed of overlapping sections 49, the underlying lower ends of which sections may be provided with transverse cleats 50 to bear against said last mentioned spanners 23 to prevent the ramp sections 49 from sliding downwardly.

As illustrated in Figure 1A and in Figure 6, the left-hand end of the next section 51, which constitutes a portion of the level scaffold or runway part 22, also includes a pair of bottom foot units F which support a transverse unit B as well as the right-hand end risers 24 of the bottom longitudinal units A of the section 47 aforementioned, and to which said risers are connected by the stems 26 thereof depending from the plate openings 29 into the tubes 37. Each side of the section 51 includes upper and lower longitudinally disposed units A, corresponding ends or risers 24 of which are disposed above the right-hand end risers 24 of the longitudinal units A of the section 47, so that the longitudinal units A of the section 51 are disposed in stepped relationship above the longitudinal units A of the section 47, as seen in Figure 1A. The left-hand end of the section 51 includes a transversely disposed unit A which is supported on the left-hand risers 24 of the upper longitudinal units A of section 51. The spanner 23 of the last mentioned transverse unit A supports the plates 34 of the top longitudinal units C of the section 47. The top part of the section 51 is formed in the same manner as the top part of the previously described section, by a pair of longitudinal units C, the risers 31 of which rest on and extend upwardly from the risers 24 of the last mentioned transverse unit A. Thus, the section 51 includes upper units C disposed in stepped relationship above the upper units C of the section 47 and an upper transverse unit A disposed in stepped relationship above the transverse unit A of the section 47. Said last mentioned unit A also provides a platform support for platform section ends 49 which rest on the spanner 23 thereof.

It will be noted that the sections 44, 45, 46, 47 and 51 of the demountable supporting structure 20 are composed solely of the basic structural units A, B, C and F.

The next section 52 likewise includes foot units F and a bottom transverse unit B, as in each of the other sections, and there above, includes a pair of longitudinal units A on each side thereof, located in the same vertical planes as the longitudinal units A of the section 47 and accordingly between and beneath the longitudinal units A of the section 51. The section 52 at its left-hand end is provided with a transverse unit A located above the right-hand ends of the upper units A of the section 51 and supported on the risers 24 thereof. The unit A of section 52 which is disposed transversely of the supporting structure is located at the same level as the transverse unit A of the section 51 and functions for the same purpose to provide a platform support. Likewise, the upper part of the section 52 is formed by two longitudinally disposed units C and the risers 31 thereof are connected to and extend upwardly from the transverse unit A of the section 52. The plates 34 of the units C of section 51 overlie the risers 31 of the units C of the section 52 and to connect said plates and risers, a pair of pins P are utilized, the stems 42 of which extend downwardly through the openings 35 of said plates and into the upper ends of said risers 31. The left-hand end of the next, last section 53, as illustrated in Figures 1A and 8, corresponds with the left-hand end of the section 51 except that no connector plates 34 are disposed between the risers 24 of the transverse unit A and the risers 31 of the top longitudinal units C. The units A and C of the section 53 are disposed in the same location as the units A and C of the section 51. Another pair of pins P are employed for connecting the overlapping ends of the units C of the sections 52 and 53.

The other right-hand end of the section 53, constituting the other end of the supporting structure 20, includes a pair of foot units F, as seen in Figures 1A and 9, above which are disposed the risers 24 of a bottom transverse unit A on which, in turn, are supported the right-hand risers 24 of the lower longitudinal units A of the section 53. Above said last mentioned risers 24 are supported a pair of spacing risers 39 of two leg elements L, on which are mounted the right-hand risers 24 of the upper longitudinal units A of the section 53, which in turn support the risers 24 of an upper transverse unit A which is disposed at the same level as the upper units A of the sections 51 and 52, and the spanner 23 of which also forms a platform support. Above the last mentioned upper transverse unit A is mounted a second pair of spacing legs L the risers 39 of which rise from the risers 24 of said last mentioned unit A and the lugs 39a of which support the plates 34 of the units C of the section 53, which are connected to said elements L by another set of pins P, in the same manner as previously described.

It will be readily apparent that the inclined or stepped structure part 21 could be made of any length and could be composed of any desired number of sections to rise to any desired height. Likewise, the level part 22 of the structure could likewise be continued indefinitely to any length. It will also be apparent that the inclined part 21 can be utilized as a part of a grandstand with planking forming seats supported crosswise thereon and resting upon the spanner elements 30 of the longitudinal units C. Also, any part of the demountable structure 20 could be increased laterally in width by utilizing additional units B connected to and extending laterally from either side thereof and in this manner commencing a lateral extension of any part of the structure 20. Such a lateral extension can also be commenced by utilizing the units C as well as the units B as engagement of the risers 24 and 31 in openings 29 and 35 permit said connector parts to be readily interconnected at any of the joints of the upright side posts which rise from the foot members F.

It will also be apparent that numerous structures may be erected using only certain ones of the basic units. For example, a rectangular tower may be erected using only the basic units A, with or without the four foot members F. Thus, the structures which can be erected from the units A, B, C, F, L and P are practically unlimited.

Various modifications and changes are contemplated and may obviously be resorted to, without departing from the spirit or scope of the invention as hereinafter defined by the appended claims.

I claim as my invention:

1. A demountable supporting structure comprising a plurality of rigid structural units detachably connected to one another, certain of said units including end risers having restricted depending stems extending from lower ends thereof and upwardly opening sockets at their upper ends sized to accommodate similar stems of other of the structural units, each of said aforementioned structural units including a spanner extending between and secured at its ends to the pair of risers of said structural unit and having a top portion disposed coplanar with said upper ends of the pair of risers, other of said structural units, constituting a second type, each comprising a spanner, corresponding to the spanner of each of said first mentioned structural units, and a pair of flat rigid connector plates, said plates having inner ends secured to an upper surface of said spanner of the second type structural unit and outer ends projecting beyond the ends of said spanner, said outer ends of the plates having openings through which risers of the first mentioned structural units extend for interconnecting the second type of structural units with said first type structural units, other of said structural units, constituting a third type, each comprising a spanner, corresponding to the spanners of said aforementioned structural units, each of said third type structural units having a riser provided with a stem fixed to one end of the spanner thereof and corresponding to a riser of the first mentioned type structural units, each of said third type structural units having a connector plate fixed to the opposite end of the spanner thereof, corresponding to the connector plates of the second type structural units, the stems of the first and third type structural units engaging sockets of other structural units of the first and third type and risers of said first and third type structural units extending through connector plate openings of the second and third type structural units for interconnecting the structural units of the three types to provide a demountable supporting structure having top portions disposed at different elevations.

2. A demountable supporting structure as in claim 3, and a fourth type of structural unit comprising a riser having a depending stem, corresponding to the risers of the first mentioned and third type structural units, said fourth type structural units functioning as post sections of the demountable supporting structure for supporting an end of the second or third type structural unit by connection with a connector plate thereof.

3. A demountable supporting structure as in claim 4, and a plurality of foot members, each constituting a fifth type structural unit and including a flat base plate adapted to rest upon a substantially horizontal supporting surface, each of said foot members including an upright element having a lower end disposed on and fixed to an upper side of the base plate and defining an upwardly opening socket sized to receive a riser stem for interconnecting structural unit risers to the foot members, each of said foot members having ribs secured to opopsite sides of the socket externally thereof and extending from end-to-end of the socket, the connector plates of the second type structural units resting on the upper ends of said ribs and the openings thereof receiving the risers, the stems of which extend into the foot member sockets.

4. A demountable supporting structure as in claim 5, and headed pins constituting a sixth type of structural unit having stems extended through openings of certain of said connector plates and into the upwardly opening riser sockets for interconnecting uppermost structural units of the supporting structure.

5. A demountable supporting structure comprising a plurality of rigid structural units deachably connected to one another, certain of said units including end risers having restricted depending stems extending from lower ends thereof and upwardly opening sockets at their upper ends sized to accommodate similar stems of other of the structural units, each of said aforementioned structural units including a spanner extending between and secured at its ends to the pair of risers of said structural unit and having a top portion disposed coplanar with said upper ends of the pair of risers, and another type of structural unit including a spanner, corresponding to the spanner of said aforementioned type of structural unit and having a riser and stem at one end, corresponding to the risers and stems of said aforementioned type of structural unit, said last mentioned type of structural unit having a rigid connector plate fixed to the upper surface of the spanner thereof and extending from the opposite end of said spanner, said connector plate having a part resting on and supported by a spanner of another structural unit and provided with a riser receiving opening spaced from the last mentioned spanner end thereof for receiving an upper riser of two superposed connected risers.

6. An elongated supporting structure comprising elongated substantially parallel corresponding sides each including at least three spaced upright posts, cross members connecting said sides at the posts; each of said sides including a plurality of first type rigid structural units, said structural units each including end risers having restricted depending stems extending from lower ends thereof and upwardly opening sockets at their upper ends sized to accommodate similar stems of other risers, each of said units including a spanner extending between and secured at its ends to the end risers and having a top portion disposed coplanar with the upper ends of the risers; each of said sides including a plurality of a second type of rigid structural unit each including a spanner, a riser secured to and depending from one end of the spanner, and a flat rigid connector plate secured to the upper side of and projecting from the opposite end of the spanner, said plate having an opening disposed beyond the spanner; each of said cross members including at least one first type structural unit, said posts each being formed by risers of said first and second type structural units and including at least one riser of a cross member, the stems of said risers engaging the sockets of other of the risers to form the posts and for connecting the structural units to one another, certain of said risers extending through the plate openings for connecting the plates to the posts, said plates each resting on and being supported by a spanner, said second type structural units of at least one end portion of the supporting structure constituting the uppermost structural units of the sides and being disposed in stepped relation to one another, and said cross members of said end portion being disposed directly beneath said second type structural units and in stepped relation to one another to combine with the sides to form a stepped frame.

References Cited in the file of this patent
UNITED STATES PATENTS

| | | |
|---|---|---|
| 832,625 | Ryan | Oct. 9, 1906 |
| 963,030 | Balch | July 5, 1910 |
| 2,311,988 | Lavin | Feb. 23, 1943 |
| 2,316,952 | Halferty | Apr. 20, 1943 |
| 2,472,423 | Hawes | June 7, 1949 |
| 2,635,717 | Albrecht et al. | Apr. 21, 1953 |
| 2,736,613 | Jagiel | Feb. 28, 1956 |
| 2,765,200 | Moyer | Oct. 2, 1956 |
| 2,771,324 | Ryder | Nov. 20, 1956 |
| 2,778,693 | Jagiel | Jan. 22, 1957 |

OTHER REFERENCES

Popular Mechanics, February 1954, page 103.